United States Patent
Mosman

(10) Patent No.: US 10,135,293 B2
(45) Date of Patent: Nov. 20, 2018

(54) DIRECT CURRENT ISOLATED-PARALLEL UNINTERRUPTIBLE POWER SUPPLY SYSTEM

(71) Applicant: Isolated Parallel Inc., Baltimore, MD (US)

(72) Inventor: Michael J. Mosman, Columbia, MD (US)

(73) Assignee: ISOLATED PARALLEL INC, Baltimore, MD (US)

( * ) Notice: Subject to any disclaimer, the term of this patent is extended or adjusted under 35 U.S.C. 154(b) by 269 days.

(21) Appl. No.: 15/085,563

(22) Filed: Mar. 30, 2016

(65) Prior Publication Data

US 2016/0294214 A1  Oct. 6, 2016

Related U.S. Application Data

(60) Provisional application No. 62/141,725, filed on Apr. 1, 2015.

(51) Int. Cl.
   *H02J 7/00* (2006.01)
   *H02J 9/06* (2006.01)
   (Continued)

(52) U.S. Cl.
   CPC ............ *H02J 9/061* (2013.01); *H02J 7/34* (2013.01)

(58) Field of Classification Search
   USPC .......................................................... 307/66
   See application file for complete search history.

(56) References Cited

U.S. PATENT DOCUMENTS 4,720,776 A   1/1988   Guyesak et al.
4,827,152 A   5/1989   Farkas
(Continued)

FOREIGN PATENT DOCUMENTS

DE   1137110 B   9/1962
DE   1563515 A1  4/1970
(Continued)

OTHER PUBLICATIONS

Bacon et al., "An improved series-parallel processing applied to a single-phase line-interactive UPS system for low power and low cost applications", Federal Technological University of Parana—UTFPR-CP, Brazil.
(Continued)

*Primary Examiner* — Rexford Barnie
*Assistant Examiner* — Xuan Ly
(74) *Attorney, Agent, or Firm* — Miles & Stockbridge P.C.

(57) ABSTRACT

A Direct Current (DC) Isolated-Parallel (Iso-Parallel or IP) Uninterruptible Power Supply (UPS) system and method for converting incoming AC power to DC power using several modules which are paralleled at their outputs yet fault isolated from each other. The DCIP UPS has two or more modules connected to a common IP Bus which operates at AC voltage and is disposed between a facility electrical distribution system and the facility's critical electrical loads which operate at DC voltage. The electrical distribution system receives power from a local utility, or from a standby power source when utility power is unavailable, and delivers AC power to the DCIP UPS input. The DCIP UPS converts the power to DC and delivers it to critical electrical loads associated with computer equipment or other devices using DC power. The individual modules that comprise the DCIP UPS share the DC loads equally, yet remain isolated such
(Continued)

DC ISO-PARALLEL UPS SCHEMATIC DIAGRAM that a fault within one module or its load will not disrupt the operation or loads of the remaining modules.

10 Claims, 6 Drawing Sheets

(51) Int. Cl.
*H02M 3/04* (2006.01)
*H02M 7/04* (2006.01)
*H02M 7/44* (2006.01)
*H02J 7/34* (2006.01)

(56) References Cited

U.S. PATENT DOCUMENTS

| | | |
|---|---|---|
| 5,126,585 A | 6/1992 | Boys |
| 5,798,633 A | 8/1998 | Larsen et al. |
| 6,134,124 A | 10/2000 | Jungreis et al. |
| 6,177,738 B1 | 1/2001 | Hentunen et al. |
| 6,198,176 B1 | 3/2001 | Gilette |
| 6,657,321 B2 | 12/2003 | Sinha |
| 6,969,922 B2 | 11/2005 | Welches et al. |
| 7,060,379 B2 | 6/2006 | Spemaza et al. |
| 7,129,593 B2 | 10/2006 | King et al. |
| 7,157,803 B2 | 1/2007 | Meyers et al. |
| 7,330,016 B2 | 2/2008 | Colley |
| 7,459,803 B2 | 12/2008 | Mosman |
| 9,735,616 B2 * | 8/2017 | Colombi .......... H02J 9/061 |
| 2004/0201282 A1 | 10/2004 | Kado et al. |
| 2005/0200205 A1 | 9/2005 | Winn et al. |
| 2006/0017328 A1 | 1/2006 | Bryde |
| 2006/0167569 A1 | 7/2006 | Colombi et al. |
| 2008/0034256 A1 * | 2/2008 | Mosman ............ H02J 9/06 714/43 |
| 2008/0088183 A1 | 4/2008 | Eckroad et al. |
| 2010/0097031 A1 * | 4/2010 | King ............ B60L 11/1803 320/109 |
| 2012/0161513 A1 | 6/2012 | Ohshima et al. |
| 2013/0076152 A1 | 3/2013 | Nielsen |
| 2013/0121045 A1 | 5/2013 | Murakami et al. |
| 2013/0336032 A1 | 12/2013 | Ohshima et al. |
| 2014/0198542 A1 | 7/2014 | Swamy |

FOREIGN PATENT DOCUMENTS

| | | |
|---|---|---|
| DE | 19857754 C1 | 9/2000 |
| EP | 0359027 A | 3/1990 |
| EP | 0519574 A | 12/1992 |
| EP | 1006641 A | 6/2000 |
| WO | 92/14292 | 8/1992 |

OTHER PUBLICATIONS

Guerrero et al., Output Impedance Design of Parallel-Connected UPS Inverters With Wireless Load-Sharing Control, IEEE Transaction on Industrial Electronics, vol. 52, No. 4, Aug. 2005.
Electrical Transmission and Distribution Reference Book, Central Station Engineers of th Westinghouse Electric Corporation, East Pittsburgh, Pennsylvania, 4th Edition, Copyright 1950.
Diesel UPS/CPS systems, Continuous power, Hitec Power Protection, The Netherlands, May 31, 2006 date alleged by third-party submission under 37 CFR § 1.99, but unsubstantiated.
No-Break KS, Dynamic UPS System Presentation, Euro-Diesel S.A., Belgium, Jun. 12, 2002.

* cited by examiner

FIG. 1   DC ISO-PARALLEL UPS BLOCK DIAGRAM

FIG. 3     DROOP CURVE

DCIP INPUT / OUTPUT ARRANGEMENT

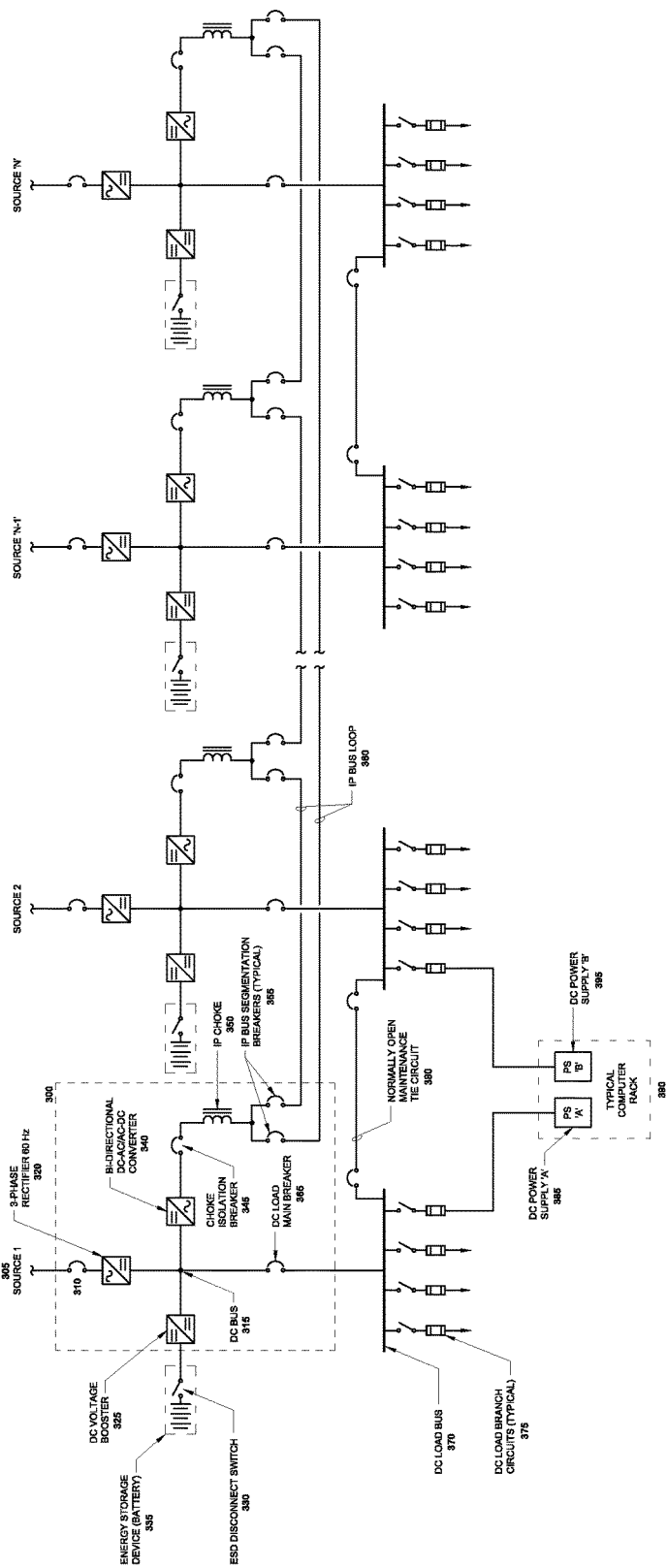
FIG. 6     DCIP APPLICATION

DIRECT CURRENT ISOLATED-PARALLEL UNINTERRUPTIBLE POWER SUPPLY SYSTEM

This application claims the priority benefit of U.S. Provisional Application No. 62/141,725, filed Apr. 1, 2015.

TECHNICAL FIELD

The present invention relates to uninterruptible power supply (UPS) systems generally, and more specifically, to isolated-parallel UPS configurations.

BACKGROUND

There is a growing need for large-scale warehousing or collocation of operational computing equipment. Data centers and high-reliability data processing facilities that use large aggregations of computer servers are typically heavy power consumers. Owners and operators of these facilities often desire to use equipment with high power utilization efficiency to reduce operating costs. To this end, UPS systems serving DC power to computer loads, and computer servers using DC power at various voltages, are being considered for their lower losses—due mostly to their reduced number of power conversion stages. For example, there has been much interest lately to power computer racks in data centers with Direct Current (DC) power instead of Alternating Current (AC) power to realize efficiency gains. However, power systems for such configurations present particular problems, i.e. they may involve costly, high amperage equipment and/or have dangerously high fault current levels. The issues of how to do this economically and with a high degree of electrical safety must be addressed.

It is also typical for data centers to house dual-corded computer equipment or servers with "A" and "B" redundant power inputs. UPS systems, therefore, should be configured with "A/B" architecture and be able to accommodate critical loads that "swing" between the "A" and "B" UPS modules. Large facilities, for example, those with critical loads larger than the capacity typically found in single UPS modules, may require multi-module UPS systems. Multi-module UPS systems may be configured in various ways to provide system and/or module redundancy, and to accommodate the A/B nature of power delivery to the critical loads. However, this arrangement often results in large amounts of backup power equipment normally working at low percentages of capacity, becoming nearly full loaded only when in maintenance or failure modes. This often results in higher costs in equipment capitalization and lower electrical efficiency during equipment operation.

Solutions have been developed to handle large critical loads while providing fault isolation among separate, multiple UPS modules (and their loads), and while also providing load sharing among those same modules to make better use of the total system capacity. An example of such a system is the Iso-Parallel UPS shown in U.S. Pat. No. 7,459,803. However, in the case of static UPS systems, it may be necessary to operate such prior iso-parallel configurations such that the power modules operate in on-line fashion (for example, with rectifier and inverter paths engaged, and static bypass switches off). Such an operating configuration, in the case of several types of static UPS, is not the highest efficiency operating mode. Further, such prior iso-parallel configurations supply the critical loads with AC power, and as such the potential efficiency gains of using DC power distribution to the computers is not realized.

Therefore, it would be desirable to provide a parallel bus that would connect multiple static rectifier DC busses and allow DC power to flow from lightly loaded rectifier busses to heavily loaded rectifier busses, and at the same time provide fault isolation among those DC busses. Unfortunately, DC parallel busses can have unacceptably high fault levels, and isolating inductor chokes which reduce fault levels in AC circuits do not work at DC voltages. Furthermore, to make a common parallel bus work in an isolated-parallel fashion it must operate at an AC voltage. If each DC bus has an inverter (or combination inverter/voltage booster) attached that converts the DC voltage to AC at a variable frequency, and also can convert the variable AC back to DC (i.e. perform a bidirectional power conversion), the outputs of those inverters can be attached to reactive chokes and an Isolated-Parallel Bus can be formed.

Furthermore, the inverters, or bidirectional converters (BDCs), need not be three-phase, but can also be single-phase only or two-phase only, and they need not be restricted to an operating frequency of 60 Hz. Indeed, the inverters or bidirectional converters (BDCs) may be operated at an elevated frequency, which would make the Iso-Parallel chokes much smaller and more economical.

SUMMARY

Embodiments may comprise a Direct Current (DC) Isolated-Parallel (Iso-Parallel, or IP) power system and method. At least one embodiment can include static rectifiers (AC to DC converters) and static inverters (DC to AC converters). Other embodiments may also include static "boosters" (DC to DC voltage regulators).

In particular, embodiments can be directed to a configuration of an Uninterruptible Power System (UPS) that accepts Alternating Current (AC) power from any type of power source or sources, and delivers it to critical loads as Direct Current (DC) power. Such a UPS is configured in multiple (two or more) static power rectifier modules that serve individual critical loads of various sizes, yet present power demands on the input sources, and on attached backup energy storage devices (ESD) acting in the temporary absence of input source, that are equalized to a high degree among the modules that make up the UPS configuration. The equalization circuit that performs the leveling of power demand at the module inputs is accomplished by bidirectional power converters (referred to bidirectional converters or BDC), rectifier/inverters that may pass power either way between an AC bus and a DC bus), and that connect the individual module DC load busses to a common AC Isolated-Parallel Bus (IP Bus) via chokes (magnetic inductors). These BDC may or may not incorporate static DC voltage boosters to assist in the bidirectional power flow into and out of the IP Bus. The chokes are sized to limit fault current from the UPS modules into and out of the common IP Bus, thus providing fault isolation among modules. By controlling the frequency of the AC side of the BDC relative to the IP Bus, the chokes cause power to flow into the DC bus from the IP Bus to supplement a high module load, or cause power to flow from the DC bus into the IP Bus to allow excess power from lighter loaded modules to be used by other modules connected to the IP Bus.

Unlike prior Iso-Parallel systems, such as those described in U.S. Pat. No. 7,459,803, embodiments can comprise a DC Iso-Parallel UPS configuration which uses 1, 2 or 3-phase bidirectional power converters in lieu of standard 3-phase inverters in static UPS modules, and the serving of critical loads with DC power in lieu of AC power. In addition, the nominal operating frequency of the IP Bus can be much higher than the typical 50 or 60 Hz of prior systems.

Various embodiments can comprise a Direct Current Isolated-Parallel (DCIP) UPS system that includes a plurality of independently operating static power conversion modules configured in an Isolated-Parallel arrangement, each said module having:

a. a rectifier that accepts AC input power from an external source and delivers DC power to an output bus configured for connection of dedicated loads;

b. an energy storage device (ESD) connected in parallel with the rectifier to supply DC power to the output bus in the absence of suitable AC input power from the source;

c. a DC voltage boosting device to regulate the ESD voltage in relation to the DC load bus voltage;

d. a variable frequency, bidirectional power converter (BDC) and inductive reactor that couples the DC output bus to a common AC Iso-Parallel Bus (IP Bus) and is capable of causing power to flow in either direction between the DC output bus and the IP Bus;

e. a control circuit configured to regulate the frequency of the BDC in accordance with a programmable Hz/watt droop curve based on the rectifier and/or ESD DC power output in such a manner as to import power into the module from the IP Bus when the rectifier and/or ESD power output is less than an average DC load demand of all modules connected to the IP Bus, and to export power into the IP Bus from the module when the rectifier and/or ESD power output is greater than an average DC load demand of all modules connected to the IP Bus; and f. a control circuit configured to adjust the DC voltage of the BDC in relation to the AC voltage of the BDC to provide voltage regulation of the DC load bus.

The DCIP UPS system may also include an IP choke configured for one of three-phase, two-phase or single-phase power to match a phase of the BDC.

At least two of said modules receive different input power, different utility sources, standby generation, or a combination thereof.

The ESD can be a chemical storage battery, a rotary flywheel, or capacitors. Some embodiments may not include an ESD.

The BDC can be a three-phase device, a two-phase device, or a single-phase device. The BDC can provide voltage transformation to adjust the IP Bus voltage level to one or more voltage levels higher than said IP Bus voltage level. The BDC may also include a control circuit configured to direct power flow into and out of the DC bus to facilitate power flow through an IP choke. The BDC may operate at a higher frequency than the nominal input source frequency.

The DC output bus in each module can be capable of supplying a load sized up to twice a rating of the rectifier, and also can be paralleled with an output bus of another module to transfer a critical load from one module to another without break or interruption.

BRIEF DESCRIPTION OF THE DRAWINGS

Embodiments will hereinafter be described in detail below with reference to the accompanying drawings, wherein like reference numerals represent like elements, in which:

FIG. 6 is a detailed schematic diagram of a DCIP UPS system in accordance with at least one embodiment.

GENERAL DESCRIPTION

Embodiments may comprise a Direct Current (DC) Isolated-Parallel (Iso-Parallel or IP) Uninterruptible Power Supply (UPS) system and method in which incoming AC power may be converted to DC power using several modules. The DCIP UPS may consist of two or more modules connected to a common IP Bus. The DCIP UPS System is typically inserted between the facility's electrical distribution system and the facility's critical electrical loads. The electrical distribution system receives power from a local utility, or from a standby power source when utility power is unavailable, and delivers AC power to the DCIP UPS input. The DCIP UPS converts the power to DC and delivers it to critical electrical loads which may consist of computer equipment or other devices using DC power.

Figure 1:
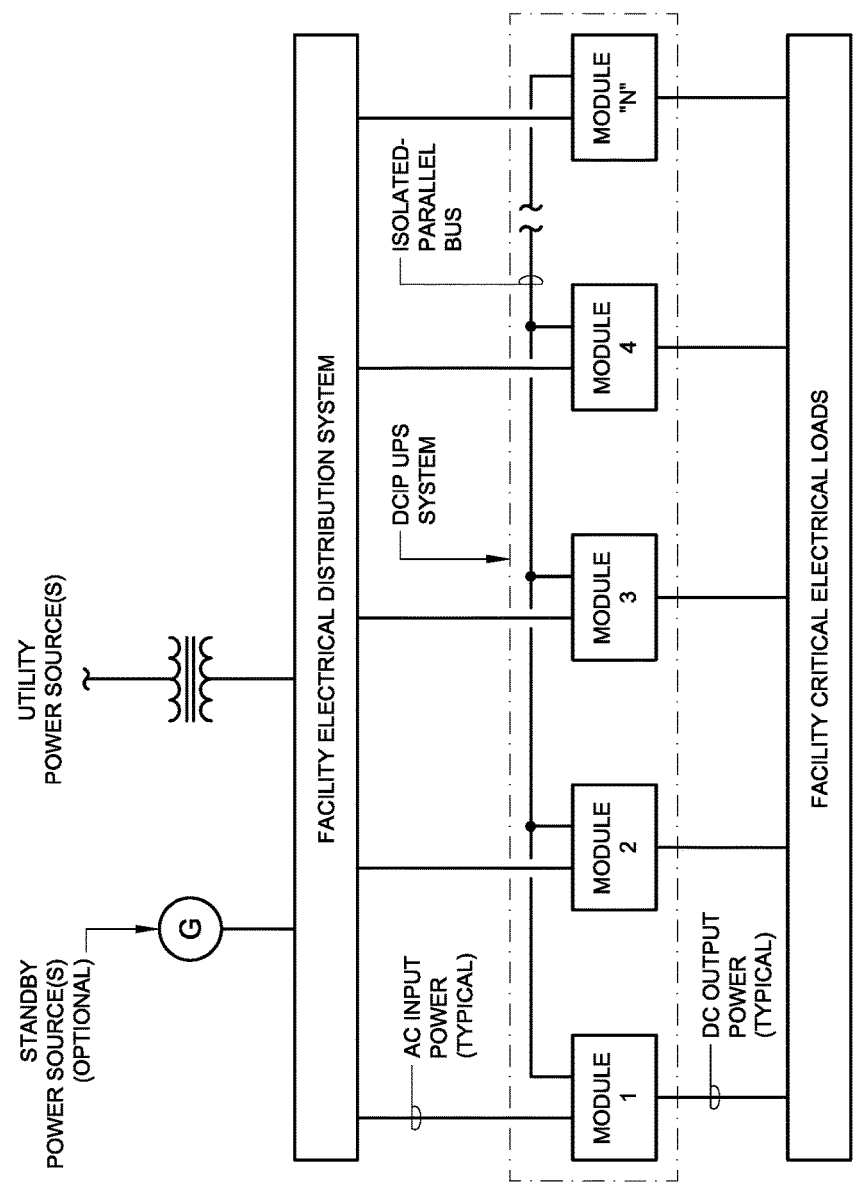
FIG. 1 is a general block diagram of a DC Iso-Parallel (DCIP) UPS System in accordance with at least one embodiment illustrating its placement in a typical facility with critical loads requiring uninterrupted DC power from a multi-module configuration.

FIG. 1 is a block diagram of a DC Iso-Parallel UPS in accordance with at least one embodiment illustrating a configuration of "N" modules in the DCIP UPS with "N" sources and "N" loads. The "N" sources may all be a single source or a combination of multiple sources. In many cases, the sources are one or two utility sources with standby engine-generators and transfer mechanisms to replace the utility power during outages. However, other types of incoming power sources may be used such as, for example and without limitation, a single utility power source, multiple utilities, standby engine-generators as single units or multiple units in parallel, or any combination thereof.

Embodiments may also be used with various types of backup energy storage such as, for example and without limitation, batteries, flywheels, capacitors, or any other type of temporary energy storage device (ESD). Furthermore, some embodiments have no energy storage at all, such as for use with a power-conversion/load-leveling system. Embodiments are independent of the duration of a backup energy source.

Embodiments are also independent of the type of solid state power electronics employed in the module rectifiers and bidirectional power converters (BDCs).

In various embodiments, the critical load served by the DCIP UPS (e.g., computers or servers) may be selected to operate from DC input power from two sources, for example, "A" and "B." In such systems, the DC voltage may be as high as 600 VDC to lower the distribution amperage and to save copper wire. Batteries or other types of ESDs can be attached downstream of the rectifiers to support the critical loads during utility power interruption.

The total critical load of a facility may be required to be divided among the modules. However, the load division may not be even, and one portion of the load may draw more power than another. Thus, various embodiments are configured to allow uneven loads to draw upon their several respective module ESDs evenly in a shared manner during utility power interruptions. Such embodiments can allow the ESDs, if present, to function in a virtualized manner such that the batteries or other ESDs are drawn down at the same rate, regardless of the actual load differences among the modules. Such an arrangement can maximize the total ESD backup time, and can allow for total facility or data center backup protection with a greatly reduced amount of ESDs.

DETAILED DESCRIPTION

Figure 2:
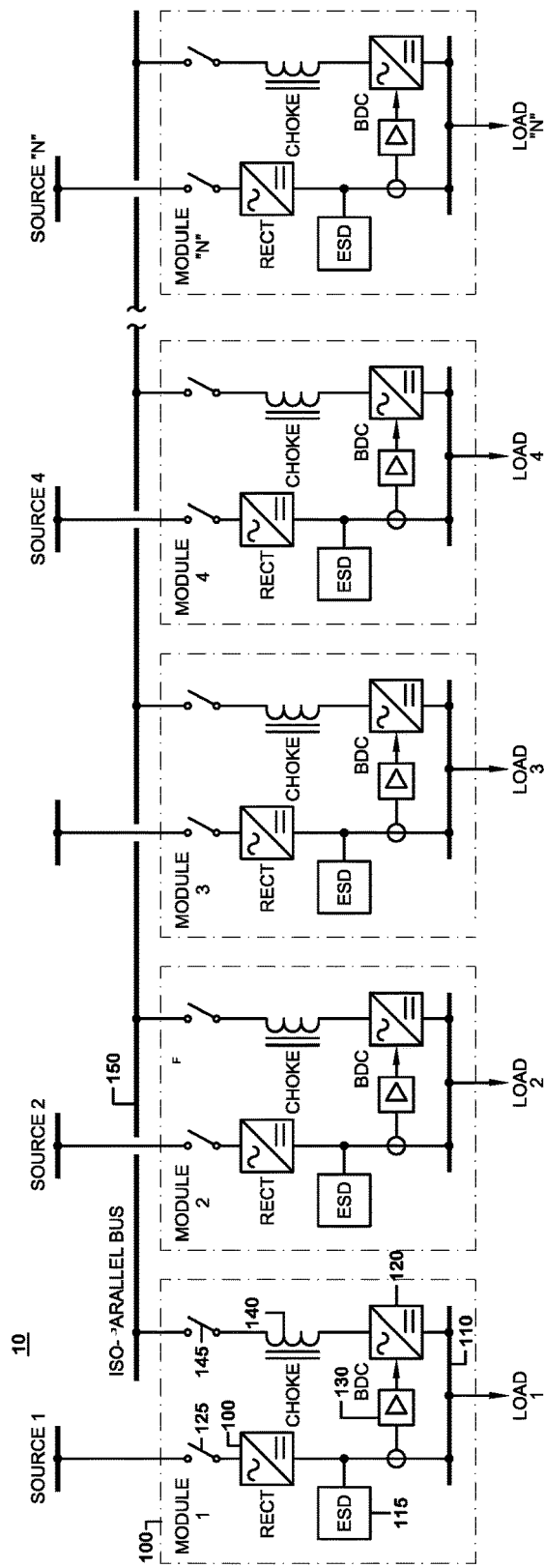
FIG. 2 is a schematic diagram of a DCIP UPS System in accordance with at least one embodiment illustrating a configuration of "N" modules in the DCIP UPS with "N" sources and "N" loads.

In particular, various embodiments can comprise a configuration of independent static power conversion modules arranged in groups of two or more to form a Direct Current Isolated-Parallel Uninterruptible Power Supply (DCIP UPS). For example, FIG. 2 is a schematic diagram of a DC Iso-Parallel UPS (DCIP UPS) 10 in accordance with at least one embodiment. Referring now to FIG. 2, the DCIP UPS 10 can comprise a configuration of "N" modules 100 in a DCIP UPS 10 with "N" sources and "N" loads.

In various embodiments, each module 100 within the group comprises an input power rectifier 105 coupled to a DC load bus 110, a bidirectional converter (BDC) 120 also coupled to the DC load bus 110, a BDC control device 130 that modulates the frequency and voltage of the BDC 120 according to the power output that is sensed flowing from the rectifier 105, and an inductive reactor 140 that couples the AC side of BDC 120 to an Iso-Parallel bus 150. Embodiments may include an optional energy storage device 115 coupled between the input power rectifier 105 and the DC load bus 110 at a point upstream of the power sensor for the BDC controller 130. Embodiments may also include a DC to DC voltage regulator (not shown) incorporated into the ESD 115 to regulate the voltage of the ESD 115 during normal energy storage periods, and to regulate the voltage on the DC load bus 110 during energy discharge periods.

The input power rectifier 105 can be configured to accept AC power from a three-phase source and to rectify the AC power to DC at an appropriate voltage. The rectified DC power is output to the DC load bus 110. The source may be connected to the input power rectifier via a switch, breaker or other protective device 125.

The DC load bus 110 may be constructed to support up to 200% of the rectifier 105 capacity. The optional energy storage device (ESD) 115 can support the loads connected to the DC load bus 110 during brief interruptions of the input power. The ESD 115 could be, for example, a battery with an appropriate DC to DC voltage regulator (not shown). However, other embodiments are possible. For example, the ESD 115 could also be a flywheel or capacitor device, or any other suitable energy storage device.

The bidirectional converter (BDC) 120 can transmit power from the IP Bus 150 to the DC load bus 110, and also from the DC load bus 110 to the IP Bus 150. The BDC 120 may be a single-phase, two-phase, or three-phase device. The BDC 120 can have a power capacity ranging between that of the rectifier 105 and that of the DC load bus 110, depending on the desired operating modes and parameters of the DCIP UPS 10. The BDC 120 may operate at any nominal frequency that is practical for the other components within the module 100 and interconnecting circuits among the modules of the group of modules comprising the DCIP UPS 10. The BDC 120 may be configured to vary its operating frequency based on input signals from the BDC control device or controller 130.

Figure 3:
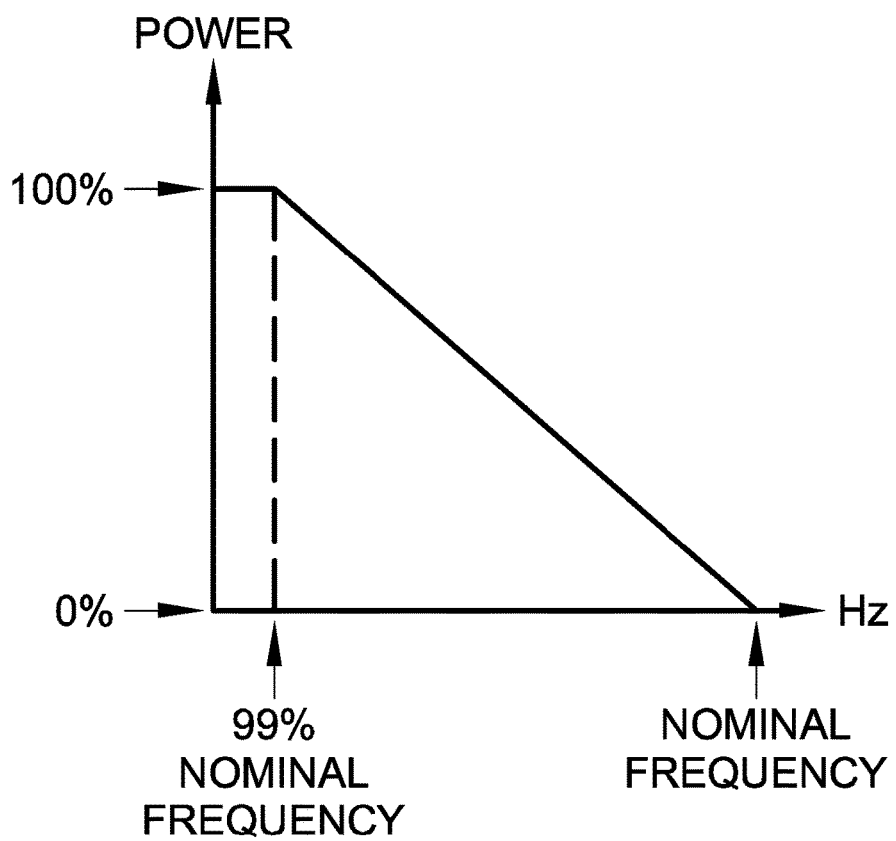
FIG. 3 is a graph showing a droop curve which illustrates a power-to-frequency relationship of a control circuit of bidirectional converters (BDC) within DCIP UPS modules in accordance with at least one embodiment.

The BDC control device 130 is designed to sense the power flow downstream of the rectifier 105 and (if present) the ESD 115, and to provide a frequency signal output to the BDC 120 to cause the BDC 120 to operate at a frequency inversely related to the power flow being measured, i.e. per a "droop curve." In the context of the present embodiments, a droop curve defines a frequency that varies by a small percentage for a power flow that varies from zero to full load (0-100%). FIG. 3 is an example of a droop curve which may be used for controlling the BDC 120 operating frequency in various embodiments. As shown in FIG. 3, as power flow increases, frequency slows (droops). The BDC 120 may incorporate controls to regulate the DC load bus 110 voltage when the module 100 output is supported from the IP Bus 150 alone, and, when in normal operation, to adjust the voltage of the BDC 120 AC output via the IP Choke 140 to match that of the IP Bus 150.

It will be appreciated that the BDC control device 130 described above can be implemented in hardware, hardware programmed by software, software instructions stored on a non-transitory computer readable medium or a combination of the above. The BDC control device 130 can include a processor configured to execute a sequence of programmed instructions stored on a non-transitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, or another structured or object-oriented programming language. The sequence of programmed instructions and data associated therewith can be stored in a non-transitory computer-readable medium such as a computer memory or transponder device which may be any suitable memory apparatus, such as, but not limited to ROM, PROM, EEPROM, RAM, flash memory, disk drive and the like.

Furthermore, the BDC controller or control device 130 can be implemented as an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, or a software module or object stored on a computer-readable medium or signal, or a single processor or as a distributed processor (single and/or multi-core, or cloud computing system), a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like.

The BDC control device 130 may also have appropriate sensors to detect the direction of power flow through the IP Choke 140 and direct the BDC 120 to operate with a corresponding power flow direction. Embodiments of the invention may do this various methods. For instance, in one embodiment the BDC controls 130 may monitor the phase angle difference of the input and output voltage of the IP Choke 140 to control the BDC 120 to import or export power, although other methods to determine power directionality may be employed.

The inductive reactor 140, which may be designated Iso-Parallel Choke or IP Choke, connects the AC input of the BDC 120 to an Iso-Parallel Bus 150 which is common to all other UPS modules 100. The IP choke 140 can have a power flow capacity equal to that of the BDC 120. As the BDC 120 varies the AC frequency in relation to the frequency of the IP Bus 150 (and, in some embodiments, varies the AC voltage of the BDC 120), a voltage phase angle difference will occur across the choke 140. Such a voltage phase angle difference will cause a proportional power flow through the choke 140 in the direction dictated by the polarity of the phase angle difference.

The equalization of power demand on the DCIP UPS modules 100 within a DCIP UPS system 10, regardless of the load division among the DC load busses 110, results from the change in frequency on the AC side of the BDC 120 as controlled by the BDC controller 130. Independent control of the operating AC frequencies of the BDCs 120 causes a corresponding positive or negative power flow through the IP Chokes 140. The BDCs 120 are then controlled to accommodate the directionality of the IP Choke 140 power flow, adding or subtracting that power flow to or from the power flowing from the rectifier 105 and/or the ESD 115 into the DC load bus.

The IP Choke 140 in some embodiments is connected to the IP Bus 150 through a switch or breaker 145, or combination of devices, so that the module 100 may operate disconnected from the other modules 100 in an "island" mode. In this mode the rectifier 105 and ESD 115 remain active, but the BDC 120 is inactive.

Figure 4:
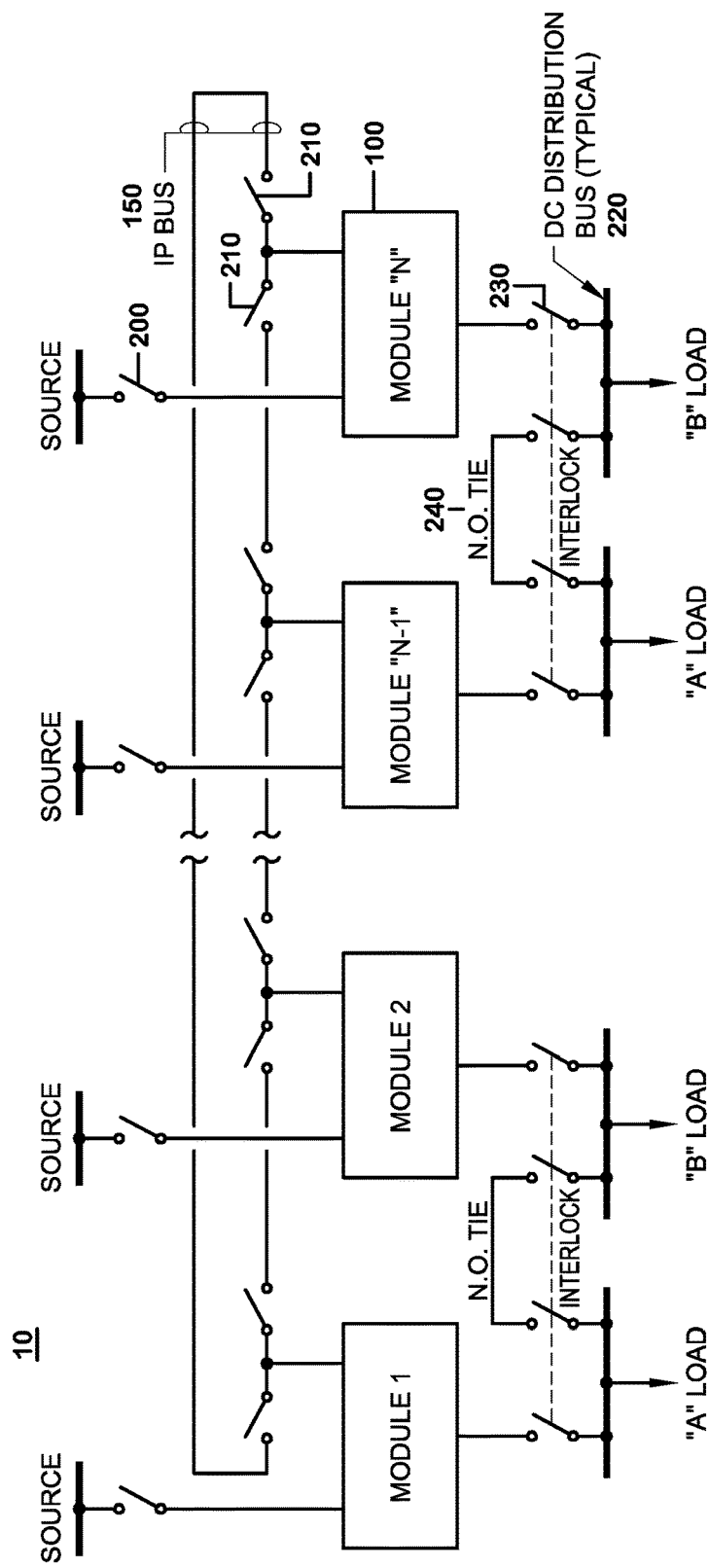
FIG. 4 is a functional block diagram illustrating a DCIP Input/Output arrangement in accordance with at least one embodiment demonstrating fault protection and maintenance bypass of modules within a DCIP UPS.

FIG. 4 is a functional block diagram illustrating a DCIP Input/Output arrangement 20 in accordance with at least one embodiment demonstrating fault protection and maintenance bypass of modules 100 within a DCIP UPS 10. Referring now to FIG. 4, in various embodiments, two or more modules 100 of a DCIP UPS 10 can be connected using a common Iso-Parallel (IP) bus 150 configured as a "ring." The IP Bus ring 150 may be segmented with isolation switches or breakers 210 which will allow for maintenance of portions of the IP Bus 150 while the remainder of the bus stays energized and operational. The "N" sources may all be a single source or any combination of utility and/or standby generator sources. In many cases, the sources are one or two utility sources with standby engine-generators and transfer mechanisms to replace the utility power during outages. If a module 100 requires isolation for maintenance it may be disconnected from its input source via switching device 200, the IP Bus 150 via bus segmentation devices 210, and its load via output isolation devices 230. The load for the module under maintenance may remain energized via tie circuit switches 240 between the "A" and "B" DC distribution busses 220.

Sequence of Operation

The common Iso-Parallel Bus (IP Bus) 150 may operate in a similar fashion as described in U.S. Pat. No. 7,459,803, which is hereby incorporated by reference as if set forth fully herein. However, the IP Bus 150 described herein may have the same number of phases as the BDC 120, which may be less than three phases. The operating voltage of the DCIP UPS 10 of the present embodiments, including that of the IP choke 140 and BDC 120, may therefore be freely chosen because the IP Bus 150 is connected only to the IP chokes 140 and is not used as a bypass source to any loads. In some embodiments, the IP Bus voltage may be as high as 2000 VAC in order to reduce amperage and installation costs.

Figure 5:
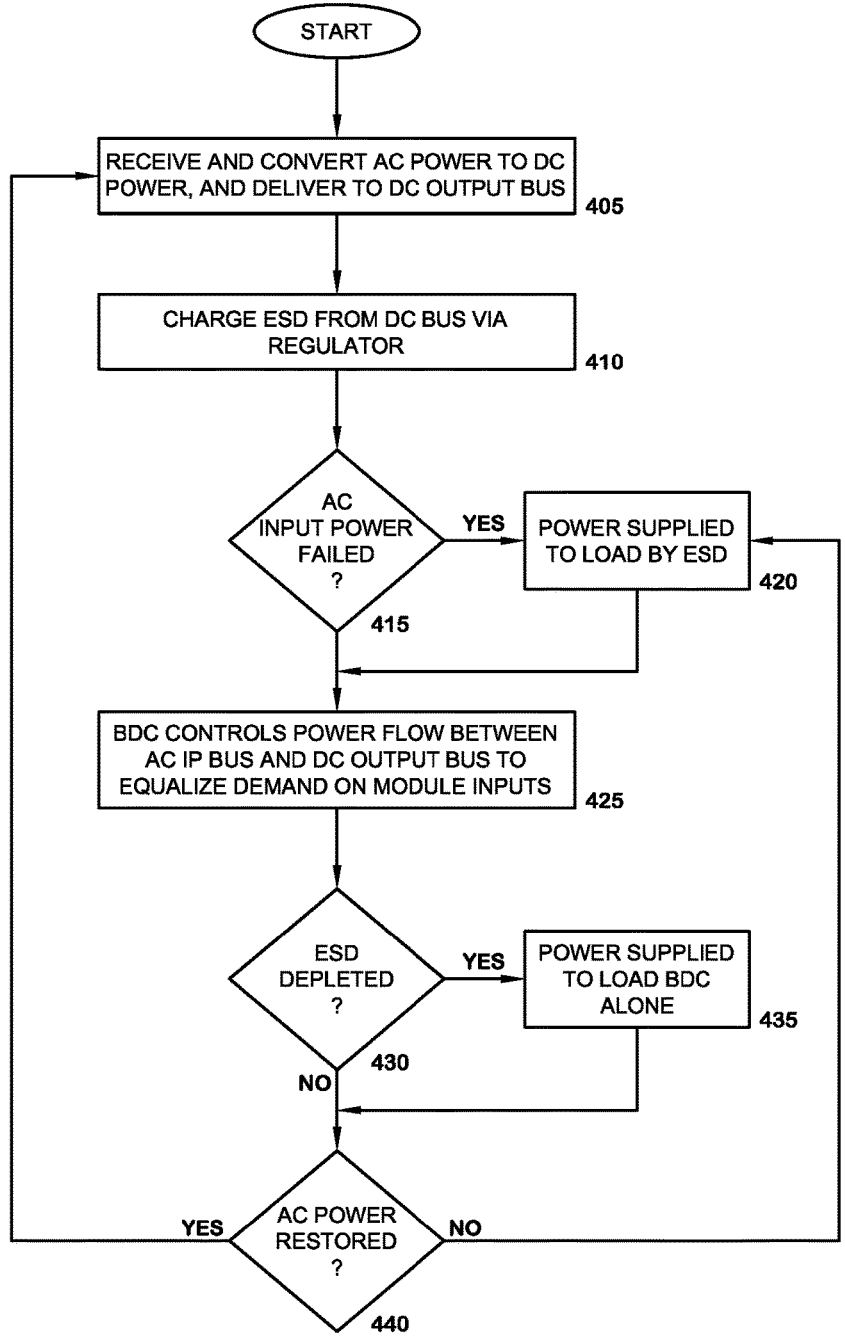
FIG. 5 is a flow chart illustrating a DCIP UPS method according to at least one embodiment.

FIG. 5 is a flow chart illustrating a DCIP UPS method 400 or sequence of operation according to at least one embodiment. Referring now to FIG. 5, the DCIP UPS 100 may operate as follows.

In normal operation, at each module 100 in the IP group 10, at 405 incoming AC power is accepted at the AC input device and converted to DC power through static rectifiers 105. The rectifiers are controlled to regulate the voltage on the DC bus. Critical loads are fed directly from the DC bus 110. The rectifier 105 also keeps the ESD 115 fully charged (at 410).

In the event of an interruption of the incoming AC power at any module 100 (at 415), the rectifier 105 turns off (and the input device may also open). The energy storage device ESD 115, which may be of any type that can accept DC charging current from the rectifier and can provide DC power to the DC bus at the desired power level, discharges its stored energy into the critical load (at 420) until the ESD 115 is depleted (at 425) or until the incoming AC power is restored (at 440). Upon restoration of the incoming AC power, the rectifier (and input device) resume service to the loads on the DC bus and recharge the ESD 115 (at 405). The bidirectional converter 120 in each module 100 operates in parallel with the rectifier 105 at all times. A control circuit 130 for the BDC senses the combined DC power flow from the rectifier 105 and ESD 115 into the DC bus 110, and adjusts the frequency of the BDC 120 according to a programmed "droop curve" (ref. FIG. 3) in such a manner as to lower the frequency when the measured DC power level rises and raise the frequency when the power level falls.

The critical load (typically, computers that operate with DC input power from two sources, "A" and "B") is divided among the modules 100. If the load is unevenly divided, the individual control circuits 130 for the BDCs will attempt to cause the BDCs 120 to operate at different AC frequencies per the droop curve. Heavily loaded modules 100 will attempt to run slower while lightly load modules 100 will attempt to run faster. This difference in frequencies causes phase shifts across the IP chokes 140 which, in turn, causes AC power flow into the IP Bus 150 (e.g., for lightly loaded modules) or out of the IP Bus 150 (e.g., for heavily loaded modules). A control circuit stably brings all modules into equilibrium at the same BDC frequency with power flows into and out of the IP Bus 150 naturally balanced (at 425). When all BDCs 120 come to be operating at the same frequency, with directionality of power flow through the BDC determined by the relative phase angle across the IP Choke 140 (or other means to determine if the load demand is greater than or lesser than the average demand of modules 100 connected to the IP bus 150), the unequal power demand on the DC load busses 110 will tempered by the power flow from/to the IP bus 150, and demand on all the rectifiers 105 and/or ESDs 115 will be equalized.

In operation, if a fault occurs on the source or at the AC input of any module 100, the rectifier 105 in that module 100 may immediately shut down, and the input device 125 may also open. The ESD 115 then supports the load until the stored energy is depleted or the input source is restored. If the input source is restored, the input device 125 re-closes and the rectifier 105 restarts. If the input source is not restored before the ESD 115 is depleted, the ESD 115 shuts off and the DC load bus 110 becomes totally supported by the BDC 120. The BDC 120 may draw power as required from the IP Bus 150, which is supported by all other modules 100 connected to the IP Bus 150.

If a fault occurs on the IP Bus 150 itself, the IP chokes 140 will limit the fault current contribution from the modules 100 connected to the IP Bus 150. Such AC faults, which are typically very low in power factor, are effectively restricted by the choke's 140 impedance. If the IP Bus 150 is configured as a properly protected segmented ring as shown in FIG. 4, the fault will disable only a portion of the IP Bus 150 and, at most, a single module's BDC 120. The affected module's BDC 120 is then shut down and the DC load bus 110 remains supplied from the rectifier 105 alone. If the module's present load is greater than the rectifier's capacity, the rectifier 105 shuts down and the DC bus 110 is de-energized. In this situation, affected computers, if provided with redundant "A/B" inputs, would transfer their demand to unaffected modules 100 serving their opposite (redundant) power supply inputs.

If a fault occurs on a module's DC output bus 110 or any DC critical load distribution bus, both the rectifier 105 and BDC 120 shut down and the ESD 115 is not activated. All other modules 100 remain totally unaffected and if the affected critical load has "A/B" inputs, the computers would immediately transfer their demand to unaffected modules 100.

Example Application

FIG. 6 presents a detailed schematic one-line diagram of a DCIP UPS 30 in accordance with at least one embodiment. The configuration in FIG. 6 represents only one of many possible configurations that may be an embodiment of a DCIP UPS system 30. Referring now to FIG. 6, a typical group of computers may be, for example, assembled in computer racks 390 (shown typically). Actual number of racks and power demand per rack may be established by the computer operations manager, for example. Each rack houses two power supplies ("A" 385 and "B" 395) that convert a higher DC voltage (400 to 600 VDC typically, but that may differ) to lower DC voltages (12 VDC and/or 5 VDC, typically) for direct consumption by the computers in that racks 390. These power supplies typically operate at high frequency, and are very compact and efficient. A rack 390 may have between 2 and 10 kW of computers in most applications, but higher loads are not uncommon. A data facility may contain several such computer racks 390, and in the example shown in FIG. 6 the computer racks are each served from two independent DC load branch circuits 375. One branch circuit at each computer rack feeds the "A" power supply 385 and the other branch circuit feeds the "B" power supply 395. These branch circuits 375 originate at DC load busses 370 that are fed from different UPS modules 300 so that the failure of either branch circuit 375, DC load bus 370 or UPS module 300 would affect only one of the two redundant power supplies 385 395 in each computer rack 390. The DC load busses 370 may be distribution switchboards, load center panelboards, plug-in style busways, or forms of electrical equipment suitable for DC power distribution. These DC load busses may also be connected in pairs with normally-open tie circuits 380, as shown in FIG. 6, to facilitate maintenance of the UPS modules 300.

Each UPS DC bus 315 is shown served by a three-phase AC to DC rectifier 320 which receives AC power from a source 305 which may be a utility or backup generator (not shown). The rectifier 320 may have an input disconnect device 310 consisting of a breaker or switch. The rectifier 320 is backed up by an energy storage device (ESD) 335 to supply power to the dc bus 315 when the module input power source 305 is not available. Each module 300 contains a DC/DC voltage booster 330 to maintain proper ESD voltage in relation to the DC bus 315. Each ESD 335 is connected via a disconnecting device 330 to its DC voltage booster 330. Each module 300 also contains a bidirectional AC/DC converter (BDC) 340 which is connected to an IP Choke 350 via an isolation breaker 345. The other end of the IP Choke 350 is connected to the IP Bus 360, which is segmented into portions with breakers 355. The IP Bus 360 is formed into a "loop" so that if a fault occurs in one segment of the IP Bus 360 the segmentation breakers 355 may isolate that portion of the IP Bus 360 and leave the remaining segments connected.

As described above, the BDCs 340 are controlled to export power into or import power out of the IP Bus 360 in a manner that produces equal power flow from the rectifiers 320 (under normal input conditions) and from the ESDs 335 (when input power is absent). Furthermore, the BDCs 315 need not be 3-phase, but may only be single-phase or 2-phase, and they need not be restricted to 60 Hz. Indeed, in at least some embodiments, the BDCs 340 may be operated at an elevated frequency, which would make the Iso-Parallel Chokes 350 much smaller and very economical.

Therefore, embodiments can comprise an Iso-Parallel ring bus 360 that connects multiple module DC busses 315 to allow DC power to flow from lightly loaded DC busses 315 to heavily loaded DC busses 315. Because AC isolating inductor chokes are not effective at DC voltages, the Iso-Parallel Bus 360 must operate at an AC voltage. Therefore, the DC load busses 315 operating through their bidirectional power converters 340 that convert DC voltage to AC voltage, and AC voltage back to DC voltage, may exchange power via the Iso-Parallel Bus 360 to equalize power demand at the sources 305, and ESDs 335. Also, the UPS modules 300 are fault isolated from each other by virtue of the IP Chokes 350 which limit fault current flow from one BDC 340 to another via the IP bus 360.

Thus has been shown and described a configuration of an Uninterruptible Power Supply (UPS), herein referred to as Direct Current Isolated-Parallel (DCIP) UPS system, that employs independently operating static power conversion modules configured in an Isolated-Parallel arrangement in which all modules incorporated are comprised of:

a. a rectifier that accepts AC input power from an external source and delivers DC power to an output bus suitable for connection of dedicated loads;

b. an energy storage device (ESD) that is connected in parallel with the rectifier to supply DC power to the output bus in the absence of suitable AC input power from the source;

c. a DC voltage boosting device to regulate the ESD voltage in relation to the DC load bus voltage;

d. a variable frequency, bidirectional power converter (BDC) and inductive reactor that couples the DC output bus to a common AC Iso-Parallel Bus (IP Bus) and is capable of causing power to flow in either direction between the DC output bus and the IP Bus;

e. a control circuit to regulate the frequency of the BDC per a programmable Hz/watt "droop curve" based on the rectifier/ESD DC power output in such a manner as to import power into the module from the IP Bus when the rectifier/ESD power output is less than the average DC load demand of all modules connected to the IP Bus, and export power into the IP Bus from the module when the rectifier/

ESD power output is greater than the average DC load demand of all modules connected to the IP Bus.

f. a control circuit to adjust the DC voltage of the BDC in relation to the AC voltage of the BDC to accommodate appropriate voltage regulation of the DC load bus.

Some or all of the modules within the DCIP UPS group may have different input power sources, different utility sources, or standby generation, or a combination thereof. The ESD in any or all modules may be a chemical storage battery, or rotary flywheel, or capacitors, or completely optional. The BDC may be three-phase, two-phase, or single-phase devices. The BDC includes a form of voltage transformation as necessary to adjust the IP Bus voltage to higher levels. The BDC includes a control circuit as necessary to direct power flow into and out of the DC bus as required to facilitate the power flow through the IP Choke.

The BDC operates at a higher frequency than the nominal input source frequency.

The IP choke may be three-phase, two-phase or single-phase to match the BDC.

The DC output bus in each module is capable of supplying a load sized up to twice the rating of the rectifier, and which may be paralleled with another module's output bus to facilitate the transfer of critical load from one module to another without break.

Thus has been shown a DCIP UPS system and method which includes connecting DC power busses to an AC Iso-Parallel Bus with single-phase or multi-phase bidirectional power converters and AC isolation chokes. According to various embodiments, the DCIP UPS may provide the following benefits.

Greater UPS System efficiency due to fewer power conversion devices in the primary power path between power sources and computer processing equipment.

Greater efficiency within computer processing equipment due to use of DC input power rather than AC power. For example, fewer power conversion steps required in computer power supplies.

Greater economy due to the use of smaller IP chokes. The chokes may be made much smaller than prior art because the IP Bus may be operated at a much higher frequency. A higher frequency provides the same amount of inductive impedance in a choke having physically smaller dimensions than in prior designs.

Greater economy due to the use of a lower amperage IP Bus and/or one with fewer phases. The BDC can operate at a higher AC voltage, and therefore lesser amperage, than the prior designs.

"Virtualization" of the ESDs and module inputs. In the absence of input source power, all ESDs may discharge at the same rate, regardless of the actual load differences among the modules. This maximizes the entire critical load's total ESD backup time and reduces the total stored energy requirement. It also equalizes the module input demand which allows for economical deployment of upstream standby power sources.

Greater ease of maintenance due to the lack of synchronization required to connect maintenance tie/bypass circuits between separate DC load busses which facilitates the no-break transfer of critical loads from one UPS module to another.

The invention claimed is:

1. A Direct Current Isolated-Parallel (DCIP) UPS system, comprising:

a plurality of independently operating static power conversion modules configured in an Isolated-Parallel arrangement, each said module comprising a rectifier that accepts AC input power from an external source and delivers DC power to an output bus configured for connection of dedicated loads;

an energy storage device (ESD) connected in parallel with the rectifier to supply DC power to the output bus in the absence of suitable AC input power from the source;

a DC voltage boosting device to regulate the ESD voltage in relation to the DC load bus voltage;

a variable frequency, bidirectional power converter (BDC) and inductive reactor that couples the DC output bus to a common AC Iso-Parallel Bus (IP Bus) and is capable of causing power to flow in either direction between the DC output bus and the IP Bus;

a control circuit configured to regulate the frequency of the BDC in accordance with a programmable Hz/watt droop curve based on the rectifier and/or ESD DC power output in such a manner as to import power into the module from the IP Bus when said rectifier and/or ESD power output is less than an average DC load demand of all modules connected to the IP Bus, and to export power into the IP Bus from the module when the rectifier and/or ESD power output is greater than an average DC load demand of all modules connected to the IP Bus; and a control circuit configured to adjust the DC voltage of the BDC in relation to the AC voltage of the BDC to provide voltage regulation of the DC load bus, wherein the DC output bus in each said module is capable of supplying a load sized up to twice a rating of the rectifier, and which may by paralleled with an output bus of another of said modules to transfer a critical load from one module to another without break.

2. The DCIP UPS system in accordance with claim 1, further comprising an IP choke configured for one of three-phase, two-phase or single-phase power to match a phase of the BDC.

3. The DCIP UPS system in accordance with claim 1, wherein at least two of said modules receive different input power, different utility sources, standby generation, or a combination thereof.

4. The DCIP UPS system in accordance with claim 1, wherein the ESD is a chemical storage battery, a rotary flywheel, or capacitors.

5. The DCIP UPS system in accordance with claim 1, wherein the BDC is a three-phase device.

6. The DCIP UPS system in accordance with claim 1, wherein the BDC is a two-phase device.

7. The DCIP UPS system in accordance with claim 1, wherein the BDC is a single-phase device.

8. The DCIP UPS system in accordance with claim 1, wherein the BDC provides voltage transformation to adjust the IP Bus voltage level to one or more voltage levels higher than said IP Bus voltage level.

9. The DCIP UPS system in accordance with claim 1, wherein the BDC further comprises a control circuit configured to direct power flow into and out of the DC bus to facilitate power flow through an IP choke.

10. The DCIP UPS system in accordance with claim 1, wherein the BDC operates at a higher frequency than a nominal input source frequency.

* * * * *